(12) United States Patent
Van Miert et al.

(10) Patent No.: US 10,534,358 B2
(45) Date of Patent: Jan. 14, 2020

(54) MARINE VESSEL PERFORMANCE MONITORING

(71) Applicant: WÄRTSILÄ FINLAND OY, Vaasa (FI)

(72) Inventors: Ronald Van Miert, DM Drunen (NL); Frank Velthuis, DM Drunen (NL); John Kop, DM Drunen (NL); Kenny Joosen, DM Drunen (NL)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 15/779,264

(22) PCT Filed: Nov. 26, 2015

(86) PCT No.: PCT/FI2015/050826
§ 371 (c)(1),
(2) Date: May 25, 2018

(87) PCT Pub. No.: WO2017/089644
PCT Pub. Date: Jun. 1, 2017

(65) Prior Publication Data
US 2018/0327052 A1      Nov. 15, 2018

(51) Int. Cl.
*G05B 23/02*           (2006.01)
(52) U.S. Cl.
CPC ................... *G05B 23/024* (2013.01)
(58) Field of Classification Search
CPC ... B63B 9/001; G05B 23/024; B63J 2099/006
See application file for complete search history.

(56) References Cited

U.S. PATENT DOCUMENTS 6,973,890 B1 *  12/2005  Staerzl .................... B63B 59/04
                                                      114/222

FOREIGN PATENT DOCUMENTS

| WO | WO 2006/123367 A1 | 11/2006 |
| WO | WO 2006/136157 A1 | 12/2006 |
| WO | WO 2010/031399 A1 | 3/2010  |

OTHER PUBLICATIONS

John Carlton, "Chapter 24: Service Performance and Analysis", Marine Propellers and Propulsion, Edition, Nov. 30, 2012. XP055295437, pp. 478-502.
(Continued)

*Primary Examiner* — Yuen Wong
(74) *Attorney, Agent, or Firm* — Buchanan Ingersoll & Rooney PC

(57) ABSTRACT

An exemplary method is disclosed for estimating operational efficiency of a marine vessel with a propeller mounted to a rotatable shaft for converting rotative shaft power transferred from the shaft to the propeller into thrust to propel the marine vessel across water, the method including obtaining a respective time series of values for operating parameters of the marine vessel; constructing a multi-dimensional power matrix for a first time period based on operating parameter values within a respective sub-series thereof that represents a first time period; computing, for one or more propulsion parameters, fouling values based on information stored in the power matrix and information stored in a base matrix, of a reference fouling level; and creating indications concerning operating status of the marine vessel in dependence of the fouling values.

20 Claims, 6 Drawing Sheets

(56) References Cited

OTHER PUBLICATIONS

Notification of Transmittal of the International Preliminary Report on Patentability (Form PCT/IPEA/416) and International Preliminary Report on Patentability (Form PCT/IPEA/409) dated Oct. 31, 2017, by the European Patent Office for International Application No. PCT/FI2015/050825.
International Search Report (PCT/ISA/210) dated Jul. 28, 2016, by the European Patent Office as the International Searching Authority for International Application No. PCT/FI2015/050826.
Written Opinion (PCT/ISA/237) dated Jul. 28, 2016, by the European Patent Office as the International Searching Authority for International Application No. PCT/FI2015/050826.
International Search Report (PCT/ISA/210) dated Aug. 23, 2016, by the European Patent Office as the International Searching Authority for International Application No. PCT/FI2015/050825.
Written Opinion (PCT/ISA/237) dated Aug. 23, 2016, by the European Patent Office as the International Searching Authority for International Application No. PCT/FI2015/050825.

\* cited by examiner

200

```
Obtain operating parameter value representing time t for
each considered operating parameter

210
```

↓

```
For each of the obtained operating parameter values,
perform rounding to the nearest available value in
accordance with a range defined for the respective
operating parameter

220
```

↓

```
Identify the cell of the power matrix defined by the
combination of rounded operating parameters values

230
```

↓

```
Increment the value in the identified cell of the power
matrix by one

Obtain a respective time series of values for a plurality of operating parameters of a marine vessel, comprising a respective time series for one or more propulsion parameters, for one or more primary operating parameters and for zero or more secondary operating parameters

410

Construct a multi-dimensional power matrix for a certain time period on basis of operating parameter values of said plurality of time series within a respective sub-series thereof that represents the certain time period

420

Compute, for one or more propulsion parameters, respective one or more fouling values on basis of information stored in the power matrix and information stored in a base matrix that represents a reference fouling level of the marine vessel

430

Create one or more indications concerning operating status of the marine vessel at least in dependence of the computed fouling values

MARINE VESSEL PERFORMANCE MONITORING

TECHNICAL FIELD

The present invention relates to a diagnostics system for monitoring operational efficiency of a marine vessel.

BACKGROUND

Overall cost of operating a marine vessel depends on a number of factors that can be measured during operation of the marine vessel. These factors include environmental factors that are independent of the marine vessel itself and vessel-related factors that reflect condition or operating characteristics of the marine vessel. Examples of the environmental factors include wind characteristics (speed, direction) and water characteristics (depth, density, viscosity), whereas examples of the of the vessel-related factors include speed of the marine vessel, draught of the marine vessel, performance of the power train of the marine vessel.

In marine vessels, a dominant approach for generating thrust to move the vessel across the water involves usage of marine propulsion. At a high level, a marine propulsion system includes a propeller attached to a rotatable shaft, whereas one or more engines in the vessel are arranged to rotate the shaft, thereby providing the thrust needed for moving the vessel. Characteristics of these (and other) components of a marine propulsion system are designed such that a desired or required amount of thrust and desired operational efficiency is provided e.g. in view of the hull design of the vessel and size of the vessel. In some scenarios, in order to reach desired/required amount of thrust and/or operational efficiency, a vessel may be provided with a plurality of marine propulsion systems like the one outlined above.

While operational efficiency of the marine propulsion system(s) is a key contributor to the operating efficiency—and hence the operating cost—of the marine vessel, there are number of vessel-related factors as well as environmental factors may play a significant role in estimation of the overall operational efficiency of the marine vessel. However, to date, there is no diagnostics system or technique available that would facilitate accounting for all major factors that contribute to the operational efficiency of the propulsion system and that would thereby facilitate invoking actions that enable operating the marine vessel in a cost-effective manner in a timely manner.

SUMMARY

Therefore, it is an object of the present invention to provide a framework for estimating operational efficiency of a marine vessel in a reliable, flexible and accurate manner.

The object(s) of the invention are reached by a system, by a method and by a computer program as defined by the respective independent claims.

According to an example embodiment, a system for estimating operational efficiency of a marine vessel that employs a propulsion system including a propeller mounted to a rotatable shaft for converting rotative shaft power transferred from the shaft to the propeller into thrust to propel the marine vessel across water is provided. The system comprises a data acquisition means for obtaining a respective time series of values for a plurality of operating parameters of the marine vessel, comprising at least a respective time series of values for one or more propulsion parameters including at least the shaft power usage, a respective time series of values for one or more primary operating parameters including at least speed through water of the marine vessel and average draught of the marine vessel, and a respective time series for zero or more secondary operating parameters; a data analysis means for constructing a multi-dimensional power matrix for a first time period on basis of operating parameter values of said plurality of time series within a respective sub-series thereof that represents said first time period, where in the power matrix a value of a given operating parameter defines a cell position along a dimension of the power matrix that represents the given operating parameter, the combination of the operating parameter values at a given time instant hence uniquely defining a cell position within the power matrix, and each cell of the power matrix stores the number of occurrences of the cell-position-defining combination of operating parameter values within said time period; data processing means for computing, for each propulsion parameter, respective one or more fouling values on basis of one or more representative propulsion parameter values derivable on basis of one or more respective subgroups of cells of the power matrix in comparison to respective one or more propulsion parameter values derivable on basis of the corresponding subgroup of cells of a base matrix, wherein the base matrix has a structure similar to that of the power matrix, where each cell of the base matrix stores the number of occurrences of the cell-position-defining combination of operating parameter values so that the cells of the base matrix jointly represent a reference fouling level of the marine vessel; and data evaluation means for creating one or more indications concerning operating status of the marine vessel at least in dependence of said fouling values.

According to another example embodiment, a method for estimating operational efficiency of a marine vessel that employs a propulsion system including a propeller mounted to a rotatable shaft for converting rotative shaft power transferred from the shaft to the propeller into thrust to propel the marine vessel across water is provided, the method comprising obtaining a respective time series of values for a plurality of operating parameters of the marine vessel, comprising at least a respective time series of values for one or more propulsion parameters including at least the shaft power usage, a respective time series of values for one or more primary operating parameters including at least speed through water of the marine vessel and average draught of the marine vessel, a respective time series for zero or more secondary operating parameters; constructing a multi-dimensional power matrix for a first time period on basis of operating parameter values of said plurality of time series within a respective sub-series thereof that represents said first time period, where in the power matrix a value of a given operating parameter defines a cell position along a dimension of the power matrix that represents the given operating parameter, the combination of the operating parameter values at a given time instant hence uniquely defining a cell position within the power matrix, and each cell of the power matrix stores the number of occurrences of the cell-position-defining combination of operating parameter values within said time period; computing, for each propulsion parameter, respective one or more fouling values on basis of one or more representative propulsion parameter values derivable on basis of one or more respective subgroups of cells of the power matrix in comparison to respective one or more propulsion parameter values derivable on basis of the corresponding subgroup of cells of a base matrix, wherein the base matrix has a structure similar to that of the power matrix, where each cell of the base matrix stores the number of occurrences of the cell-position-defining combination of operating parameter values so that the cells of the base matrix jointly represent a reference fouling level of the marine vessel; and creating one or more indications concerning operating status of the marine vessel at least in dependence of said fouling values.

According to another example embodiment, a computer program is provided, the computer program including one or more sequences of one or more instructions which, when executed by one or more processors, cause one or more apparatuses to at least perform the method according to the example embodiment described in the foregoing.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where

FIG. 3 illustrates a method according to an example embodiment;

FIG. 5 illustrates a method according to an example embodiment; and

DESCRIPTION OF SOME EMBODIMENTS

Figure 1:
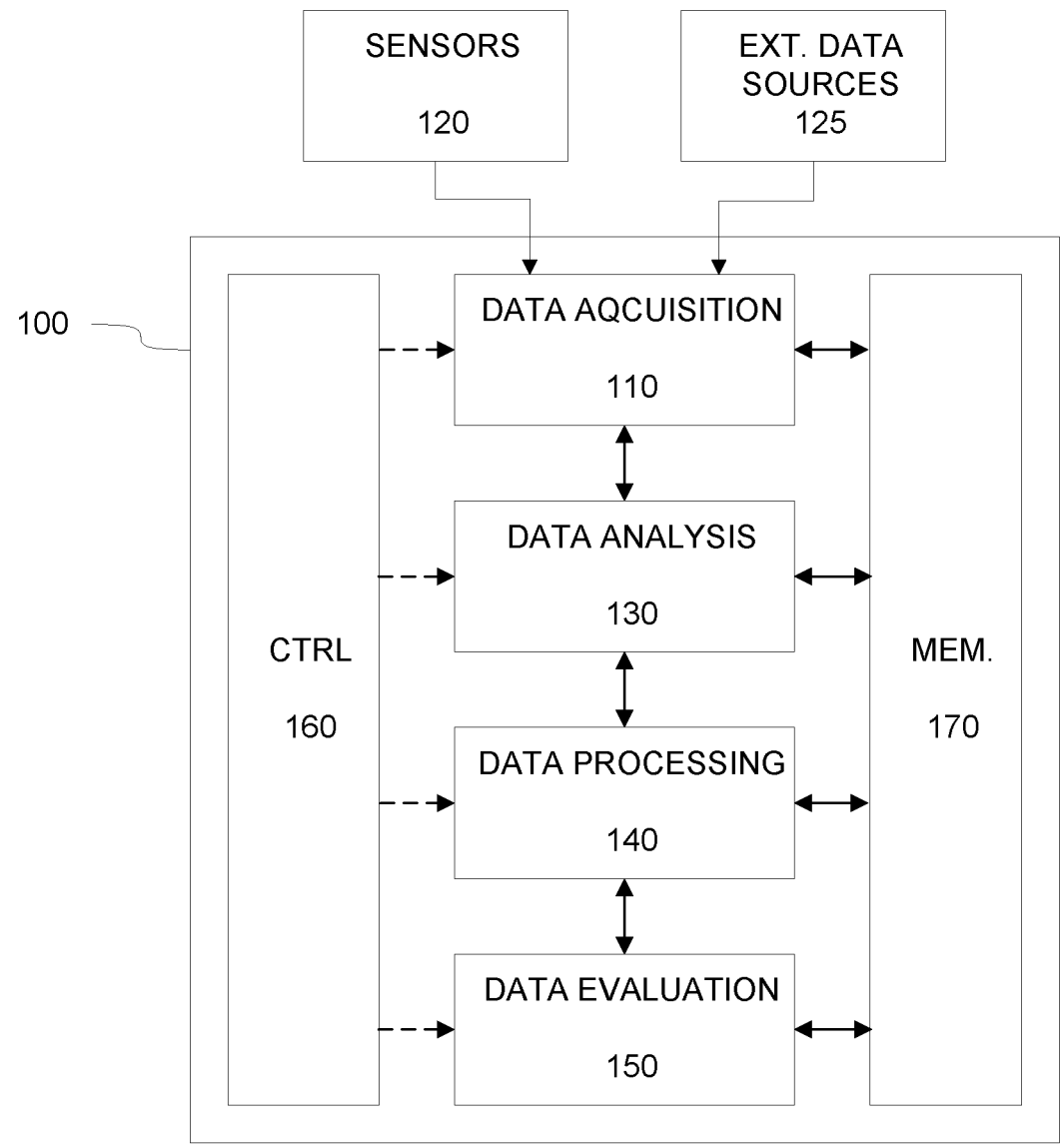
FIG. 1 illustrates a block diagram of some logical components of a diagnostics system according to an example embodiment.

In the following, a diagnostics system for monitoring operational efficiency of a marine vessel that employs marine propulsion for generating thrust to move the vessel across water as an example. Furthermore, in examples that consider measurement values that are descriptive of operational characteristics and/or operational efficiency of a propulsion system of the marine vessel, we assume that the propulsion system comprises an engine, a transmission system, a shaft and a propeller, where power is transmitted from the engine via the transmission system to rotate the shaft, and the propeller that is mounted at the external end of the shaft converts the rotative power transferred to the shaft into the thrust power that propels the marine vessel through water.

The thrust power obtained from the propeller is partly consumed due to roughness and fouling of the hull of the marine vessel that and the thrust power may also be compromised due to roughness and fouling of the propeller. In marine operating conditions, the roughness and fouling of both the hull and the propeller typically gradually increase over time, thereby having a (negative) effect on operational efficiency of the marine vessel. As a consequence, due to roughness and/or fouling of the hull and/or the propeller, the rotative power transferred to the shaft, referred to as shaft power, to reach certain speed through water for the marine vessel may be higher than necessary, e.g. higher than that required in case of substantially clean hull and/or propeller of the marine vessel.

There are also a number of other aspects that may have an effect on the thrust power obtained from the propeller at a certain shaft power, including environmental factors that are independent of the marine vessel itself and vessel-related factors that reflect current operating characteristics of the marine vessel and components thereof. Examples of the environmental factors include wind characteristics (speed, direction) and water characteristics (depth, density, viscosity), whereas examples of the of the vessel-related factors include speed of the marine vessel, draught of the marine vessel, trim of the marine vessel, rudder angle of the marine vessel, etc.

Using the shaft power in the propulsion system as an example, a traditional approach for diagnosing operation of a marine vessel may involve tracking of values of operating parameters that indicate the employed shaft power required for a certain speed through water at different draughts of the marine vessel. Tables 1 and 2 below provide an illustrative example in this regard.

TABLE 1

| t1  | 10 kn    | 11 kn    | ... |
|-----|----------|----------|-----|
| 8 m | 4800 kW  | 5300 kW  |     |
| 9 m | 5000 kW  | 5500 kW  |     |
| ... |          |          |     |

TABLE 2

| t2  | 10 kn    | 11 kn    | ... |
|-----|----------|----------|-----|
| 8 m | 4850 kW  | 5380 kW  |     |
| 9 m | 5050 kW  | 5560 kW  |     |
| ... |          |          |     |

In Tables 1 and 2, each column indicates the observed shaft power usage at a certain speed through water at a number of draughts, whereas each row indicates the observed shaft power usage at a certain draught at a number of speeds through water. Table 1 indicates the observed shaft power values for a first period of time t1 and Table indicates corresponding observed shaft power values for a second period of time t2 that is different from the first period of time t1. For the sake of example, each of t1 and t2 may indicate a respective month of the year.

Tables 1 and 2, or other similar tables, enable comparison of the shaft power usage in comparable vessel conditions, in this case at a certain speed through water in certain draught, between the time periods t1 and t2. Consequently, the change in the shaft power usage in comparable vessel conditions may be considered as an indication of degraded operational performance of the marine vessel and the extent of change may be used as an input to a diagnostics system that may provide an indication or decision concerning a vessel maintenance operation on basis of the extent of change in the shaft power usage in one or more comparable vessel conditions.

Although the shaft power usage at different speeds through water in different draughts of the marine vessel may be able to capture some important factors that have an effect on the overall operational efficiency of the vessel, more detailed and reliable characterization of the operating characteristics of the marine vessel and operational performance of the marine vessel as well as a more comprehensive analysis of observed operational characteristics and operational performance is desirable in order to enable more accurate basis for an indication or decision concerning any vessel maintenance operations that may be beneficial to ensure operating the marine vessel as efficiently as possible.

To account for this need, in the following a diagnostics system that, in part, relies in a power matrix is described by a number of examples. At a high level, the diagnostics system tracks values of a plurality of operating parameters of the marine vessel, where each operating parameter is descriptive of a respective characteristic of the marine vessel's operating condition or operating environment. Each characteristic of the operating condition or operating environment of the marine vessel is represented by a corresponding dimension or 'axis' of the power matrix, and the value of the respective operating parameter defines a position within the power matrix along said dimension or 'axis'. Consequently, assuming that n operating parameters of the marine vessel are considered, the power matrix is provided as an n-dimensional entity. A cell of the power matrix is defined by respective values of each of the n operating parameters, which values also define the operating condition corresponding to the cell. Each cell stores a value that indicates a number of occurrences of the vessel's operating condition that corresponds to the respective combination of the operating parameter values. In other words, the power matrix can be considered to provide an n-dimensional histogram of operating conditions of the marine vessel.

Tables 3 and 4 exemplify the concept of maintaining operating parameter values for the marine vessel in comparison to approach exemplified in Tables 1 and 2.

TABLE 3

| 4800 kW | 10 kn | 11 kn | ... |
|---|---|---|---|
| 8 m | 2 | 0 | |
| 9 m | 0 | 0 | |
| ... | | | |

TABLE 4

| 5000 kW | 10 kn | 11 kn | ... |
|---|---|---|---|
| 8 m | 0 | 0 | |
| 9 m | 3 | 0 | |
| ... | | | |

Table 3 provides the histogram of occurrences for a plurality of each pairs of the marine vessel's speed through water and the draught of the marine vessel for the shaft power 4800 kW, whereas Table 4 provides the corresponding histogram for the shaft power 5000 kW. It should be noted that the data shown in Tables 3 and 4 represent only a limited subset of data shown in Tables 1 and 2, while on the other Tables 3 and 4 additional provide information regarding relative frequency of occurrence of the considered pairs of speed through water and draught. Further tables of similar type are provided for other considered values of the shaft power, these tables thereby providing a third dimension of the power matrix. In a practical application, the number of dimensions n of the power matrix may be significantly larger than three, e.g. in the range from 10 to 20.

In general, an operating parameter may assume basically any value within a range of valid or feasible values of the respective operating parameter. To enable providing a power matrix of feasible size in each considered matrix dimension, a respective range of operating parameter values that are considered in the power matrix may be defined for each of the operating parameters of the power matrix. A range may define a minimum value and a maximum value for the respective operating parameter together with a grid of values therebetween (or, in a way, a set of quantization levels) that defines the available values of the respective operating parameter in the power matrix. Typically, the grid-points that define the available operating parameter values are regularly spaced between the respective minimum and maximum values. When a new data point, i.e. an input value for each of the considered operating parameters, is entered in the power matrix, each input value may be 'rounded' to the closest available value for the respective parameter, and the cell associated with the new data point is hence defined by the 'rounded' input values of the operating parameters.

As non-limiting examples, the operating parameters considered in the power matrix may include some of the following:
shaft power usage $P_D$ in the propulsion system
thrust T generated by the propeller;
torque Q in the shaft;
rotational speed $\omega$ of the shaft;
the speed $V_S$ of the marine vessel through water,
average draught D of the marine vessel,
wind speed $v_{air}$, wind direction $\psi_{air}$ in relation to the marine vessel,
kinematic viscosity of water $v$, water depth H,
trim of the marine vessel,
propeller pitch P,
rudder angle $\alpha_{rud}$ of the marine vessel,
fin stabilizer angle $\alpha_{fin}$ in the marine vessel.

FIG. 1 illustrates a block diagram some logical components of an exemplifying diagnostics system 100 for a marine vessel for estimating operational efficiency of the marine vessel. Along the lines described in the foregoing, it may be assumed that the marine vessel employs a propulsion system including the engine, the transmission system, the shaft and the propeller, where power is transmitted from the engine via the transmission system to rotate the shaft. The propeller is mounted at the external end of the shaft for converting the rotative shaft power transferred from the shaft to the propeller into thrust to propel the vessel across the water.

As an overview, the diagnostics system 100 comprises a data acquisition means 110 for obtaining a respective time series of a plurality of operating parameter values of the marine vessel, a data analysis means 130 for constructing, on basis of the obtained operating parameter values, one or more power matrices that each characterizes operational status of the marine vessel in a respective time period, data processing means 140 for computing one or more fouling values on basis of information stored in one or more power matrices, and data evaluation means 150 for creating one or more indications concerning operating status of the marine vessel at least in dependence of the one or more fouling values. The data acquisition means 110 may be arranged to obtain the operating parameter values from a sensor means 120 and/or from one or more external data sources 125. The diagnostics system 100 further comprises a control means 160 for controlling operation of the data acquisition means 110, the data analysis means 130, the data processing means 140 and the data evaluation means 150. The diagnostics system 100 is further depicted with a memory 170 for storing information, e.g. the measurement values obtained by the data acquisition means 110 and/or the power matrix constructed by the data analysis means 130.

The logical components of the diagnostics system 100, i.e. the data acquisition means 110, the data analysis means 130, the data processing means 140, the data evaluation means 150, the control means 160 and the memory 170 may be provided by a single device or apparatus that also has access to the sensors 120 and/or to the external data sources 125. As an example, such a device or apparatus may be provided on board the marine vessel.

Figure 2:
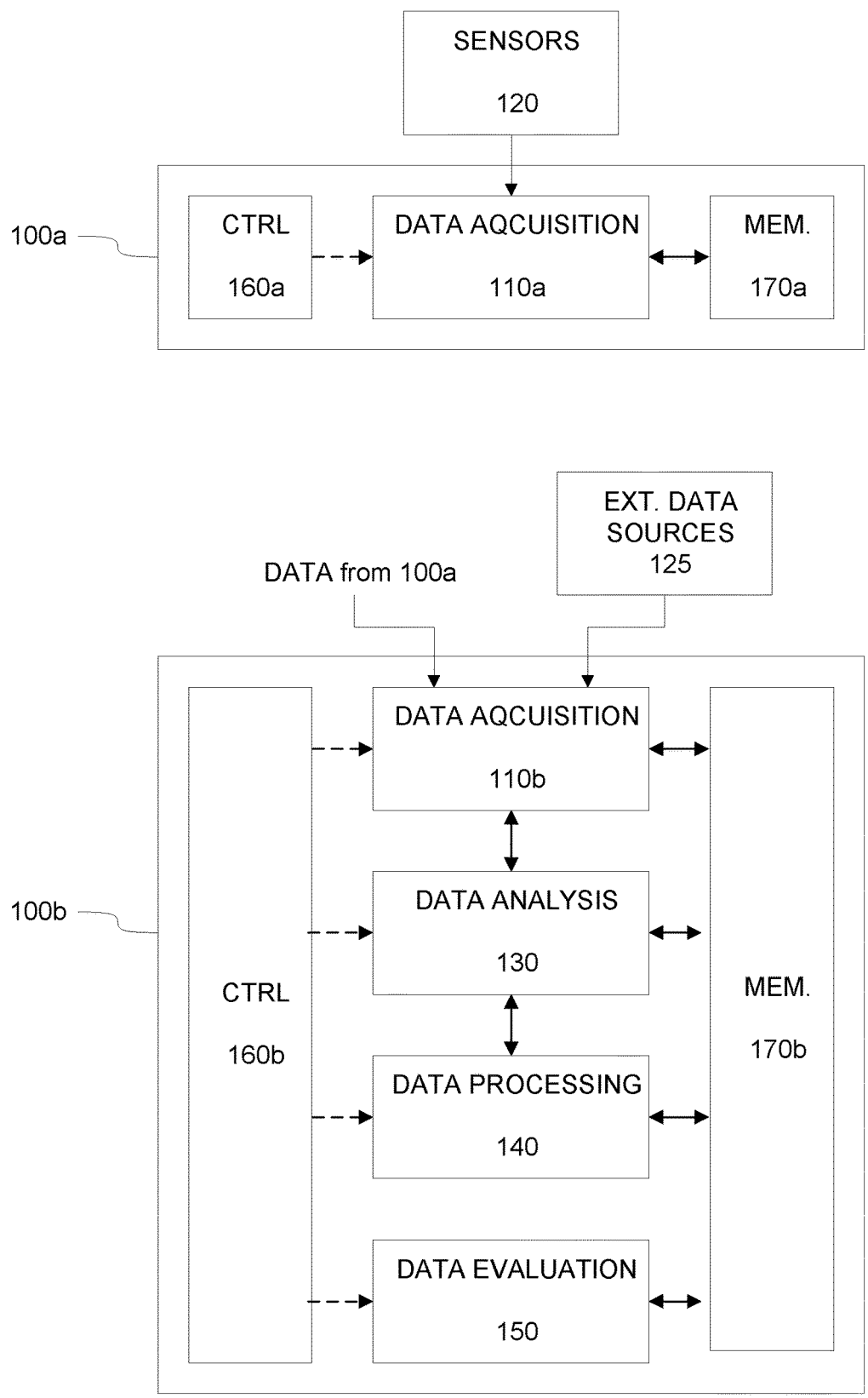
FIG. 2 illustrates block diagrams of some logical components of sub-systems according to an example embodiment.

FIG. 2 illustrates a block diagram some logical components of an exemplifying sub-systems 100a and 100b that provide a variation of the diagnostics system 100 outlined in the foregoing. The sub-system 100a may be provided by a device or apparatus that is on board the marine vessel while the sub-system 100b may be provided outside the marine vessel, e.g. in a device or apparatus arranged in a ship owner's office.

Herein, the operations of the data acquisition means 100 are distributed to a first data acquisition means 110a in the sub-system 100a and to a second data acquisition means 110b in the sub-system 100b such that the first data acquisition means 110a may be arranged to obtain the operating parameter values from the sensor means 120, whereas the second data acquisition means 110b may be arranged to obtain the operating parameter values from the one or more external data sources 125 as well as from the sub-system 100 (e.g. the operating parameter values stored in the memory 170a by the first data acquisition means 110a). Along similar lines, the operations of the control means 160 are distributed to a first control means 160a in the sub-system 100a and to a second control means 160b in the sub-system 100b, and the memory 170 is provided as a first memory 170a in the sub-system 100a and as a second memory 170b in the sub-system 100b.

The sensor means 120 comprises a plurality of sensors, each arranged to measure or monitor a respective operational parameter of the marine vessel or a value that is useable for deriving an operational parameter of the marine vessel. Each of the sensors in the sensor means 120 may be arranged to continuously provide a respective measurement signal that is descriptive of the current value of a respective operational parameter. As a few non-limiting examples, the sensors 120 may include e.g. one or more of the following sensors:

a thrust sensor for measuring the thrust T generated by the propeller;
a torque sensor for measuring torque Q in the shaft of the propulsion system;
a rotational speed sensor for measuring rotational speed w of the shaft of the propulsion system;
a speed sensor for measuring the marine vessel's speed through water $V_S$;
a draught sensor for measuring the draught D of the marine vessel;
an anemometer for measuring the wind speed $v_{air}$ and the wind direction $\psi_{air}$;
an attitude sensor for measuring the trim of the marine vessel;

Moreover, e.g. values for each of the propeller pitch P, the rudder angle $\alpha_{rud}$ and the fin stabilizer angle $\alpha_{fin}$ may be obtained from a steering system of the marine vessel, which hence, at least conceptually, serves a sensor in point of view of the diagnostics system 100 or the sub-system 100a.

Each of the sensors in the sensor means 120 may be communicatively coupled to the data acquisition means 110, 110a (and possibly also to the other components of the diagnostics system 100 or the sub-system 100a). The coupling may be provided e.g. by a respective dedicated electrical connection between a sensor and the data acquisition means 110, 110a or by a bus, such as a controller area network (CAN) bus. Each of the sensors may be provided using a suitable sensor device of respective type known in the art.

The external data sources 125 may comprise one or more databases available in respective external server devices that are accessible by the data acquisition means 110, 110b (and/or by one or more other components of the diagnostics system 100, or the sub-system 100b) via a suitable wireless or wired communication means that enable connecting the diagnostics system 100 or the sub-system 100b to a computer network, which in turn enables connection to the respective external server device. As an example, the one or more databases may be accessible via the Internet. Examples of measurement values that may be obtained from the external data source(s) include e.g. water related parameters such as the viscosity of water v and the water depth H.

The data acquisition means 110, 110a may be arranged to obtain respective measurement values from sensors of the sensor means 120, for example, by periodically reading the measurement signal provided by the respective sensor. Reading of a new measurement value from each of the sensors may take place at predefined, regular time intervals or according to another predefined schedule. Alternatively or additionally, the data acquisition means 110, 110a may be arranged to read a new measurement value from each of the sensors in response to a command or request received from the control means 160. The measurement values so obtained from the sensor means 120 serve as respective propulsion parameters and/or operating parameters of the marine vessel. The obtained measurement values may be passed to the data analysis means 130 and/or they may be stored in the memory 170, 170a for subsequent access by the data analysis means 130 or by one or more other components of the diagnostics system 100. For the sub-system 100b, the measurement values received from the sub-system 110a may be stored in the memory 170b. When stored in the memory 170, 170a, 170b, the measurement values read from each of the sensors of the sensor means 120 may be arranged into a respective time series of measurement values in a suitable data structure in the memory 170, 170a, 170b, thereby not only providing access to the most recent (or instantaneous) measurement value from each of the sensors but also providing access to a history of measurement values. A suitable data structure in this regard may include, for example, a table, a linked list, a database, etc.

Along similar lines, the data acquisition means 110, 110b may be arranged to obtain measurement values for one or more operational parameters from respective ones of the one or more external data sources 125 by reading each of the external data sources at predefined, regular intervals (or according to another predefined schedule) and/or by reading the each of the external data sources in response to a command or request from the control means 150, 150b. These measurement values may serve as respective operational parameters of the marine vessel, and they may passed to the data analysis means 130 and/or stored in the memory 170, 170b for subsequent access. As in case of measurement values obtained from the sensor means 120, also the measurement values from the one or more external data sources 125 may be stored in the memory 170, 170b in respective time series of measurement values.

As described in the foregoing, the data analysis means 130 is arranged to construct one or more power matrices $PM_i$ that characterizes operational status of the marine vessel on basis of the measurement values obtained by the data acquisition means 110, 110b for a respective time period of the vessel operation. In this regard, the data analysis means 130 may be arranged to use the obtained measurement values as such as the respective operational parameter values, the time series of measurement values hence serving as the respective time series of operating parameter values. Alternatively, the data analysis means 130 may be arranged to derive an operating parameter value on basis of temporally aligned measurement values originating from two or more sensors (or external data sources), the operating parameter values so derived hence constituting the time series of operating parameter values. For clarity of description of some aspects of the power matrix approach, the following exemplifying classes of operating parameters may be defined:

Propulsion parameters, including at least the shaft power usage $P_D$, and possibly also one or more of the thrust T generated by the propeller, and the rotational speed w of the shaft;

Primary operating parameters that define the basic vessel condition, including at least the marine vessel's speed through water $V_S$ and the average draught D of the marine vessel;

Secondary operating parameters that define details of the vessel condition and/or operating conditions, including e.g. one or more of the wind speed $v_{air}$, the wind direction $\psi_{air}$, the water viscosity v, the water depth H, the trim of the marine vessel, the propeller pitch P, the rudder angle $\alpha_{rud}$, the fin stabilizer angle $\alpha_{fin}$, etc.

Herein, the shaft power usage $P_D$ may be computed on basis of temporally aligned measurement values that indicate the torque Q in the shaft of the propulsion system and the rotational speed w of the shaft of the propulsion system (obtained from the respective sensors of the sensor means 120), which relate to the shaft power usage $P_D$ via the equation $P_D=Q\cdot\omega$. For the remaining examples listed in the foregoing for the propulsion parameters, the primary operating parameters and the secondary operating parameters, the respective measurement values that are temporally aligned with the torque Q and rotational speed ω may be applied as respective operating parameters as such.

The data analysis means 130 may be arranged to construct the power matrix $PM_i$ on basis of operating parameter values obtained in a time period i that covers time from $t_i$ to $t_i+t_{dur}(i)$. In each time series of operating parameter values considered in the power matrix $PM_i$, time period i corresponds to a respective sub-series of operating parameter values that represent the operating parameter values in the time period i. The duration $t_{dur}(i)$ of the time period i may be e.g. a value in a range from a few days to a few months. The data analysis means 130 may be arranged to periodically (e.g. at predefined time intervals) construct a new power matrix $PM_i$ using a predefined value for $t_{dur}(i)$. Alternatively or additionally, the data analysis means 130 may be arranged to construct a new power matrix $PM_i$ in response to a request or command from the control means 160 using a predefined value or a value defined in the request/command for $t_{dur}(i)$.

The power matrix $PM_i$ is initialized by setting each cell to a zero value. In an example, the construction of the power matrix $PM_i$ includes, for each time instant t in the time period i for which the operating parameters values are available, incrementing the value of the cell of the power matrix $PM_i$ defined by the respective values of the operating parameters by one. Once all time instants t in the time period i have been considered and the cells of the power matrix $PM_i$ have been updated accordingly, the power matrix $PM_i$ for the time period i is completed.

Figure 4:
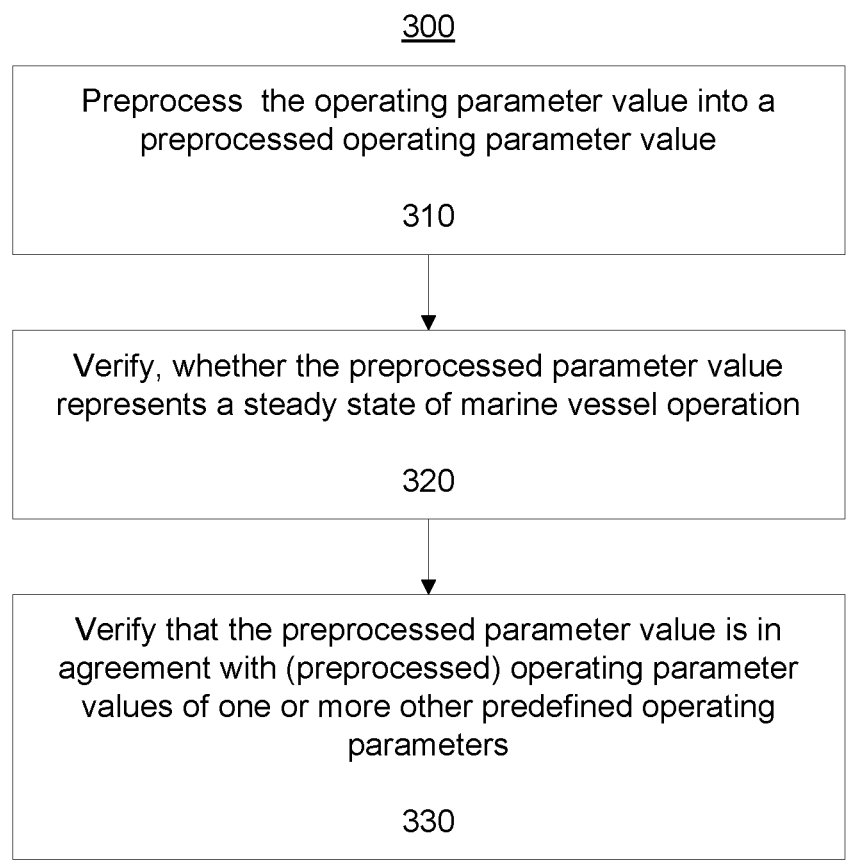
FIG. 4 illustrates a method according to an example embodiment.

FIG. 4 depicts a flowchart that outlines a procedure 200 for entering information on basis of operating parameter values at time instant t into the power matrix $PM_i$. In block 210, an operating parameter value representing time instant t is obtained for each of the operating parameter considered in the power matrix $PM_i$. In block 220, each obtained operating parameter value is 'rounded' to the closest available value in accordance with the range of values defined for the respective operating parameter (as described in the foregoing). In block 230, the cell of the power matrix $PM_i$ that is defined by the combination of 'rounded' operating parameter values is identified, and in block 240 the value of the identified cell is incremented by one. In a variation of the procedure 200, the operations of block 220 are omitted for one or more (possibly for all) operating parameters. In such a case it is assumed that the 'rounding' of the respective operating parameter values is not necessary or that the 'rounding' of the respective operating parameter values is carried out before receiving the values in block 210. The procedure 200 (or a variation thereof) may be repeated for the operating parameter values at each time instant t of interest within the time period i. to complete the power matrix $PM_i$ for the time period i.

The completed power matrix $PM_i$ may be passed to the data processing means 140 for further analysis and/or the completed power matrix $PM_i$ may be stored in the memory 170, 170b for subsequent access e.g. by the data analysis means 130, the data processing means 140 and/or the data evaluation means 150. Due to its structure and manner of creation, the final value of each cell of the power matrix $PM_i$ serves as an indication of time spent in operating condition defined by the combination of operating parameter values that define the respective cell within the power matrix $PM_i$ (in relation to time spent in other conditions corresponding to other cells of the power matrix).

In another example, the analysis means 130 is arranged to screen each of the operating parameter values for time instant t before making a decision for using them to update the power matrix $PM_i$. For operating parameters that are derived on basis of one or more measurement values, e.g. the shaft power usage $P_D$, the screening may be carried out for operating parameters so derived. The screening operation may be carried out, for example, as part of operations of block 210 of the procedure 200, as part of operations of block 220 of the procedure 200 or between operations of blocks 210 and 220 of the procedure 200.

FIG. 3 depicts a flowchart that outlines an example of the screening procedure 300. In block 310, the obtained operational parameter values for time instant t are preprocessed to remove contribution of small measurement errors or disturbances in the measurement signals, thereby ensuring smooth evolution of the operating parameter values over time within the respective time series. The preprocessing may involve, for example, low-pass filtering the respective time series of operating parameter values using a predefined set of filter coefficients to derive the respective preprocessed operating parameter value, averaging the operating parameter values in the respective time series over a predefined time window to derive the respective preprocessed operating parameter value, or selecting a median of the operating parameter values within a predefined time window as respective preprocessed operating parameter value. Details of the preprocessing operation(s) may be defined differently for each of the operating parameters.

In block 320, it is verified that the preprocessed operating parameter value derived in block 310 represents a steady operational state of the marine vessel. This verification may involve, for example, verifying that the preprocessed operating parameter value is below a predefined threshold value, verifying that the preprocessed operating parameter value is above a predefined threshold value, or verifying that the standard deviation of preprocessed operating parameter values within a predefined time window is smaller than a predefined threshold. Details of the steady state verification operation(s) may be defined differently for each of the operating parameters.

In case the verification of block 320 fails for any of the operating parameters for time instant t, the operating parameter values for time instant t are not used for updating the power matrix $PM_i$. In contrast, in case the verification of block 320 is successful for all operating parameter values for time instant t, steady operating state of the marine vessel is assumed and the screening procedure may proceed to block 330 to further verify that the preprocessed value of a given operating parameter for time instant t is in agreement with preprocessed values of one or more other predefined operating parameters for the same time instant. As examples in this regard, the verification may require that if the value of a given operating parameter is above (below) a first predefined threshold, the value of a predetermined other operating parameter must be above (below) a second predefined threshold, or require that if the value of a given operating parameter is above (below) the first predefined threshold, the value of the predetermined other operating parameter must be below (above) the second predefined threshold. Such criterion enables ruling out operating parameter value combinations that are clearly in error. Details of the verification operation(s) of block 330 may be defined differently for each of the operating parameters.

In case the verification of block 330 fails for any of the operating parameters for time instant t, these parameter values are not used for updating the power matrix $PM_i$. In contrast, in case the verification of block 330 is successful for all operating parameters for time instant t, the preprocessed operating parameter values are used for updating the power matrix $PM_i$ by incrementing the value in the cell defined by the combination of preprocessed operating parameter values at time instant t by one. In an exemplifying variation of the screening procedure 300, operations pertaining to one or two of the blocks 310, 320 and 330 may be omitted.

Multiple cells of the power matrix $PM_i$ may form, at least conceptually, a vessel state. In a certain vessel state, each of the propulsion parameters (e.g. the shaft power usage $P_D$, the thrust T and/or the rotational speed w of the shaft) may assume any (valid) value, whereas operating parameters of each of the primary and secondary operating parameters have respective constant values. In other words, each vessel state involves a subgroup of cells that is defined by a respective value combination of the primary and secondary operating parameters. Each such combination of constant primary and secondary operating parameter values hence defines a respective vessel state that includes a subgroup of cells where the operating parameter values of the propulsion parameters may vary.

Multiple vessel states may form, at least conceptually, a subset. In a certain subset, the primary operating parameters (e.g. the marine vessel's speed through water $V_S$ and the draught D of the marine vessel) have respective constant values, whereas each of the propulsion parameters and the secondary operating parameters may assume any (valid) value. In other words, each subset involves a group of cells that is defined by a respective value combination of the primary operating parameters. Each such combination of constant primary operating parameter values hence defines a respective subset that includes a plurality of subgroups that form a group of cells.

Assuming that the power matrix $PM_i$ accounts for all operating parameters that have a significant effect to the operational efficiency of the marine vessel during the time period i, in particular to the shaft power usage $P_D$ required to sail at constant speed through water $V_S$, we may further assume that any increase in the shaft power usage $P_D$ over time results from fouling of the marine vessel, e.g. hull fouling and/or propeller fouling.

The data analysis means 130 creates and maintains a base matrix BM that has a structure and dimensions similar to those of the power matrix $PM_i$. Thus, the definition of the vessel states and subsets described in the foregoing apply to the base matrix BM as well. The base matrix BM contains history data at a reference fouling level of the marine vessel. The reference fouling level may represent any constant fouling level, e.g. a substantially clean condition of the marine vessel, especially substantially clean condition of the hull and the propeller of the marine vessel. The cells of the base matrix BM may be initialized to zero values. Consequently, the base matrix BM is useable for comparing the operating status that of the marine vessel represented by the power matrix PM to the reference fouling level represented by the base matrix BM for determination of the fouling level represented by the power matrix $PM_i$. These comparisons may be carried out at a cell level, at a vessel state level or at a subset level. In order to ensure ruling out any variation due to small measurement errors and minor inaccuracy of the sensor data while at the same time ensuring that all important factors that have an effect on the vessel performance are taken into account, the comparisons are preferably carried out at the vessel state level and/or at the subset level.

The data processing means 140 may be arranged to carry out fouling calculations for a plurality of vessel states, e.g. for all vessel states derivable on basis of the power matrix $PM_i$ or for a predefined set of vessel states. As described in the foregoing, cells of the power matrix $PM_i$ that have constant values for the primary and secondary operating parameters define a respective subgroup of cells of that form a vessel state of the power matrix $PM_i$. In this regard, the processing means 140 defines J vessel states for the power matrix $PM_i$, where each vessel state is identified by index j, with $1 \leq j \leq J$. For each propulsion parameter in each vessel state j of the power matrix $PM_i$, a propulsion parameter value that is representative of the vessel state j is computed as an average (or as another suitable linear combination) of respective propulsion parameter values associated with the cells of the power matrix $PM_i$ belonging to the subgroup of cells that form the vessel state j. Assuming the exemplifying propulsion parameters that include the shaft power usage $P_D$, the thrust T and/or the rotational speed w of the shaft, the respective (averaged) propulsion parameter values representative of the vessel state j in the power matrix $PM_1$ may be denoted as $P_D(PM_1, j)$, $T(PM_1, j)$ and $\omega(PM_1, j)$.

According to an example, all propulsion parameter values that are associated with the cells in the subgroup that form the vessel state j are considered in computation of a representative propulsion value for the vessel state j. According to another example, only propulsion parameter values that are associated with cells that have non-zero value are considered in computation of a representative propulsion value for the vessel state j, whereas in a further example only propulsion parameter values that are associated with cells that have a value exceeding predefined threshold are considered in computation of a representative propulsion value for the vessel state j.

Moreover, corresponding representative propulsion parameter values are computed, in a similar manner, for the each of the vessel states j on basis of information stored in the base matrix BM. Assuming the exemplifying propulsion parameters $P_D$, T and/or $\omega$, the respective (averaged) propulsion parameter values representative of the vessel state j in the base matrix BM may be denoted as $P_D(BM, j)$ $T(BM, j)$ and $\omega(BM, j)$.

In order to characterize the difference between the marine vessel's operational state represented by the power matrix $PM_1$ and the reference fouling state of the marine vessel represented by the base matrix BM, the data processing means 140 may compute the difference values between respective representative propulsion parameter values in the power matrix $PM_i$ and in the base matrix BM for each vessel state j. Each of these difference values may also be referred to as a respective error value, and each of these difference values serves to represent an increment in respective propulsion parameter value in vessel state j in comparison to the respective propulsion parameter value derived for the vessel state j on basis of the data stored in the base matrix BM. Assuming the exemplifying propulsion parameters $P_D$, T and/or $\omega$, the data processing means 140 may compute the difference values (or error values) $\Delta P_D(j)=P_D(PM_1, j)-P_D(BM, j)$, $\Delta T(j)=T(PM_1, j)-T(BM, j)$, and $\Delta\omega(j)=\omega(PM_1, j)-\omega(BM, j)$.

As described into foregoing, one or more vessel states j may form a subset that includes all cells of the vessel states j that belong to the respective subset. In particular, a subset is formed by those vessel states j for which the respective values of the primary operating parameters of the marine vessel have the same combination of values. In this regard, the data processing means 140 may define K subsets on basis of the information stored in the power matrix $PM_i$ in view of the J vessel states. Basically, the J vessel states may form up to K subsets, each identified by index k, with $1 \leq k \leq K$. Assuming the exemplifying primary operation parameters that include the marine vessel's speed through water $V_S$ and the draught D of the marine vessel, for each subset the values of $V_S$ and D are constant whereas values of the secondary operation parameters and the values of the propulsion parameters may vary.

The data processing means 140 may further combine the computed difference values (or error values) across the vessel states that belong to the subset k into a respective combined difference value. The combination of difference values for the subset k may be carried out as a weighted average of the respective difference values computed for the vessel states that belong the subset k. In an example, the weighting factor for weighting a difference value representing vessel state j is defined as the sum of the values of the cells belonging to the vessel state j divided by the sum of the values of the cells across all vessel states that constitute the subset k. In another example, a first factor $N_{j,min}$ is defined for each vessel state j of the subset k as the smaller of the sum of the values of the cells belonging to the vessel state j in the power matrix $PM_i$ and the sum of the values of the cells belonging to the vessel state j in the base matrix BM, and a second factor $N_{j,sum}$ is defined as the sum of the first factors $N_{j,min}$ across all vessel states that belong to the subset k. Consequently, the weighting factor for weighting a difference value representing vessel state j in computation of the combined difference value for the subset k is defined as the ratio of the firsts factor $N_{j,min}$ to the second factor $N_{j,sum}$, i.e. as $N_{j,min}/N_{j,sum}$.

Usage of a suitable weighting, e.g. one of the examples described in the foregoing serves to ensure that the difference values are weighted in accordance with the number of occurrences of the respective vessel state to emphasize contribution from those vessel states that occur more frequently and, conversely, to de-emphasize contribution from those vessel states that occur less frequently. Assuming the exemplifying propulsion parameters $P_D$, T and/or w, the data processing means 140 may compute the combined difference values as weighted averages that are denoted by $\Delta P_D(k)$, $\Delta T(k)$, and $\Delta\omega(k)$.

Each of the combined difference values for the propulsion parameters in the K subsets (e.g. $\Delta P_D(k)$, $\Delta T(k)$, and $\Delta\omega(k)$ with $1 \leq k \leq K$) represent the total fouling contribution in view of the respective propulsion parameter. These K combined difference values for each considered propulsion parameter may also be referred to as respective fouling values for the time period i, in other words they are descriptive of the deviation from the reference fouling level represented by the base matrix BM for the respective propulsion parameter in the vessel's operating conditions represented by subset k. As a particular example, the combined difference values (or fouling values) $\Delta P_D(k)$ for the shaft power usage $P_D$ indicate the fouling values as excess shaft power usage resulting from operating the marine vessel according to the combination of primary operating parameter values that define the respective subset k.

Once the fouling calculations on basis of the power matrix $PM_i$ described in the foregoing are complete, the data processing means 140 may automatically proceed into updating the base matrix BM for subsequent fouling calculations.

In this regard, the updating procedure starts by subtracting the combined difference values (i.e. the fouling contribution) computed for the propulsion parameters of the K subsets from the power matrix $PM_i$. The subtraction is carried out separately for each of the propulsion parameters in each of the K subsets. The subtraction that accounts for a given propulsion parameter in subset k is carried out by shifting the cell values of the subset k of the power matrix $PM_i$ by the amount defined by the combined difference value (i.e. the fouling value) derived for the given propulsion parameter in the subset k, where the shifting is applied along the dimension of the power matrix $PM_i$ that represents the value of the given propulsion parameter. In case the shifting would result in moving the cells between available values in view of the grid-points defined by the respective range, the fouling value that defines the amount of shifting may be rounded such that shifting that amounts for an integer number of grid-points takes place. Using the shaft power usage $P_D$ as an example of a propulsion parameter, this may involve shifting the cells of the power matrix $PM_i$ along the matrix dimension that represents the value of $P_D$ by the amount defined by $\Delta P_D(k)$ in each of the K subsets.

The power matrix $PM_i$ from which the contribution of the combined difference values (e.g. $\Delta P_D(k)$, $\Delta T(k)$, and $\Delta \omega(k)$) has been subtracted may be referred to as a shifted power matrix $PM'_i$. Due to the subtraction, the information in the shifted power matrix $PM'_i$ corresponds to the constant fouling level represented by the information stored in the base matrix BM. The base matrix BM may be updated by adding the shifted power matrix $PM'_i$ thereto. The addition may be carried out by adding the cell values of the shifted power matrix $PM'_i$ to the values of the corresponding cells of the base matrix BM to create an updated base matrix BM'. The updated base matrix BM' may be employed as the base matrix BM for subsequent fouling calculations based on a subsequent power matrix $PM_{i+1}$ constructed on basis of operating parameter values obtained for a time period from time $t_{i+1}$ to time $t_i + t_{dur}(i+1)$.

Since the base matrix BM is typically initialized with zero values upon running the diagnostic system 100 or the sub-system 100b for the first time, i.e. running the diagnostic system to generate the first power matrix $PM_1$, there may be no meaningful reference data in the base matrix BM until a few power matrices $PM_i$ have been created and used for updating the base matrix BM. In fact, it may take a learning period of a few updating rounds before the reference data in the base matrix BM enables meaningful fouling calculations on basis of the power matrix $PM_i$ and the base matrix BM. Consequently, the fouling calculations by the data analysis means 130 may be omitted for those power matrices $PM_i$ that belong to the learning period and, instead, the power matrices $PM_i$ of the learning period may be directly added to the base matrix BM (e.g. as described in the foregoing for adding the shifted power matrix $PM'_i$ to the base matrix BM). The learning period duration may be defined e.g. as the number of time periods t based on which the power matrices $PM_i$ are constructed and used for the base matrix BM, and the learning period may include e.g. M first time periods of operation of the diagnostics system 100 (or the sub-system 100b) after installation or initialization. As a non-limiting example, M=3 may be used to define the learning period.

The data evaluation means 150 may be arranged to create one or more indications concerning at least one operating condition of the marine vessel on basis of one or more fouling values derived for one or more subsets k on basis of respective power matrices $PM_i$ created for one or more time periods i. Such indications may be created, for example, in response to a request or command received from the control means 160.

As an example in this regard, the data evaluation means 150 may derive, on basis of one or more fouling values defined for subset k from a plurality of time periods i, a function that represents the respective fouling value as a function of time. The function may be derived, for example, as a line or as a curve by using numerical analysis methods known in the art. Such a function may be derived for a plurality of fouling values and/or for a plurality of subsets k, and the one or more functions may be provided for presentation to a human observer via a user interface of the diagnostic system 100 or the sub-system 100b, e.g. by displaying respective graphs or other representations of the one or more functions in an electronic display. Consequently, the human observer may use the information so displayed to estimate future values of the respective fouling values in respective operating conditions of the marine vessel, which in turn facilitates operating the marine vessel in an efficient and cost-effective manner.

As a particular example, such a function may be derived for the fouling value $\Delta P_D(k)$ that serves as an indication of the excess shaft power usage for the subset k that corresponds to current operating conditions of the marine vessel, e.g. the subset k that represents the marine vessel's current speed through water $V_S$ and the current draught D of the marine vessel. Moreover, the function so derived may be provided for presentation to a human observer via the user interface of the diagnostic system 100 or the sub-system 100b, e.g. by displaying a graph or other representation of the derived function in the electronic display device. Consequently, the human observer may use the information so displayed to estimate future values of the excess shaft power usage in the current operating conditions of the marine vessel, which in turn facilitates e.g. estimating the point in time where the cost incurred due to the excess shaft power outweighs the cost of a vessel maintenance operation (e.g. cleaning of the hull and the propeller).

The control means 150 may be arranged to control operation of the data acquisition means 110, the data analysis means 130, the data processing means 140 and the data evaluation means 150 to carry out estimation of operational efficiency of the marine vessel as desired.

In this regard, the control means 150 may be arranged to issue a first set of commands or requests, including one or more commands or requests to the data analysis means 130 to carry out construction of the power matrix $PM_i$. These commands or requests may indicate the duration $t_{dur}(i)$ for the time period i based on which the respective power matric $PM_i$ is to be constructed. Moreover, the control means 150 may be arranged to issue a second set of commands or requests, including a command or request to the data evaluation means 140 to create the one or more indications.

The control means 150 may be arranged to issue each of the first and second sets commands automatically in accordance with a respective predefined schedule, e.g. at respective regular time intervals. Alternatively or additionally, the control means 150 may be arranged to issue any of the first and second sets of command in response to a user request received via the user interface of the diagnostics system 100. The control means 150 may be further arranged to issue a command or request to the data acquisition means 110 to read respective measurement values from the sensor means 120 and/or from the external data sources 125. Such a command or request may be automatically invoked e.g. periodically (for example at regular time intervals).

Along similar lines, the control means 160a may be arranged to control operation of the data acquisition means 110a to obtain the measurement values from the sensor means 120 as desired, whereas the control means 160b may be arranged to control operation of the data acquisition means 110b, the data analysis means 130, the data processing means 140 and the data evaluation means 150 to carry out estimation of operational efficiency of the marine vessel as desired.

FIG. 5 depicts a flowchart that outlines a method 400 according to an example embodiment. The method 400 may implement the functionality of the diagnostics system 100 or that of the sub-systems 100a and 100b described in the examples provided in the foregoing. The method 400 serves to estimate operational efficiency of a marine vessel that employs a propulsion system including a propeller mounted to a rotatable shaft for converting rotative shaft power transferred from the shaft to the propeller into thrust to propel the marine vessel across water.

The method 400 comprises obtaining a respective time series of values for a plurality of operating parameters of the marine vessel, as indicated in block 410. The obtained time series comprise at least a respective time series of values for one or more propulsion parameters including at least the shaft power usage, a respective time series of values for one or more primary operating parameters including at least speed through water of the marine vessel and average draught of the marine vessel, and a respective time series for zero or more secondary operating parameters, as described in various examples in the foregoing.

The method 400 further comprises constructing a multi-dimensional power matrix for a first time period on basis of operating parameter values of said plurality of time series within a respective sub-series thereof that represents said first time period, as indicated in block 420. The structure, content and various other characteristics of the power matrix are described in various examples in the foregoing. The method 400 further comprises computing, for one or more propulsion parameters, respective one or more fouling values on basis of information stored in the power matrix and information stored in the base matrix, as indicated in block 430. The structure, content and various other characteristics of the base matrix are described in various examples in the foregoing. The method 400 further comprises creating one or more indications concerning operating status of the marine vessel at least in dependence of the fouling values, as indicated in block 440.

Each of the data acquisition means 210, the data analysis means 230, the evaluation means 240 and the control means 250 may be provided using respective hardware means, respective software means, or respective combination of hardware means and software means. Alternatively, the same piece of hardware means, software means or combination of the hardware and software means may be employed to provide a combination of two or more of the data acquisition means 210, the data analysis means 230, the evaluation means 240 and the control means 250.

Along similar lines, in context of the exemplifying method 300, each of the blocks 310, 320 and 330 may be provided using respective hardware means, respective software means, or respective combination of hardware means and software means, whereas the same piece of hardware means, software means or combination of the hardware and software means may be employed to provide a combination of two or more of blocks 310, 320 and 330.

Figure 6:
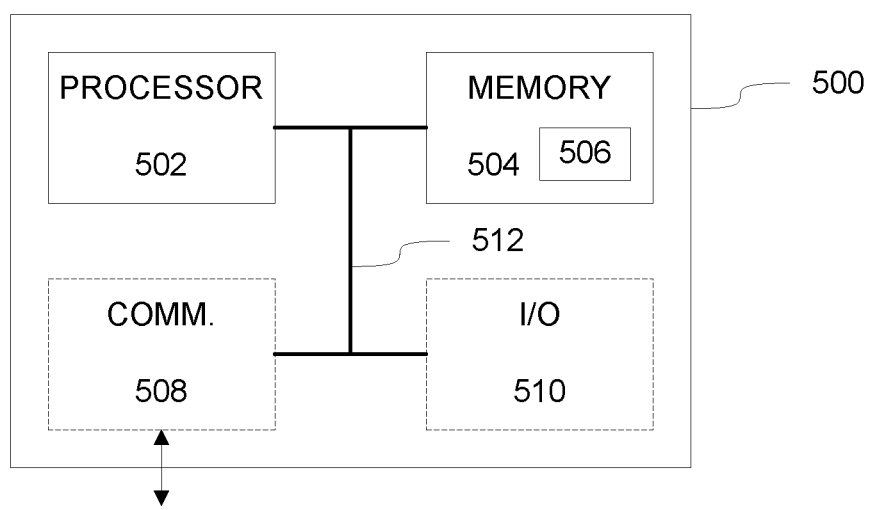
FIG. 6 illustrates a block diagram of some components of an apparatus according to an example embodiment.

As an example of providing the components of the diagnostics system 200 using a combination of hardware means and software means, FIG. 6 illustrates a block diagram of some components of an exemplifying apparatus 500. The apparatus 500 comprises a processor 502 and a memory 504 for storing data and computer program code 506. The memory 504 may comprise or may implement the memory 160, 160a, 160b described in the foregoing. The processor 502 is configured to read from and write to the memory 504. The apparatus 500 may further comprise a communication means 508 for communicating with another apparatuses or devices. The communication means 508 may provide interface means for connecting the sensor means 120 and/or wireless and/or wired communication means that enable communication with other apparatuses using respective communication protocols. The apparatus 500 may further comprise user I/O (input/output) components 510 that may be arranged, together with the processor 502 and a portion of the computer program code 406, to provide a user interface for receiving input from a user and/or providing output to the user. The user I/O components 510 may comprise hardware components such as a display, a touchscreen, a touchpad, a mouse, a keyboard and/or an arrangement of one or more keys or buttons, etc.

The processor 502 may be arranged to control operation of the apparatus 500 in accordance with a portion of the computer program code 506 stored in the memory 504 and possibly further in accordance with the user input received via the user I/O components 510 and/or in accordance with information received via the communication means 508. The memory 504 and a portion of the computer program code 506 stored therein may be further arranged, with the processor 502, to provide a control function or control means for controlling operation of the apparatus 500. The processor 452, the memory 504, the communication means 508 and the user I/O components 510 may be interconnected by a bus 512 that enables transfer of data and control information. The apparatus 500 may comprise further components in addition to those shown in the illustration of FIG. 6.

Although the processor 502 is depicted as a single component, the processor 502 may be implemented as one or more separate processing components. Similarly, although the memory 502 is depicted as a single component, the memory 504 may be implemented as one or more separate components, some or all of which may be integrated/removable and/or may provide permanent/semi-perm anent/dynamic/cached storage.

The computer program code 506 stored in the memory 504 may comprise computer-executable instructions that control the operation of the apparatus 500 when loaded into the processor 502. The computer program code 506 may include one or more sequences of one or more instructions. The processor 502 is able to load and execute the computer program code 506 by reading the one or more sequences of one or more instructions included therein from the memory 504. The one or more sequences of one or more instructions may be configured to, when executed by the processor 502, cause the apparatus 500 to carry out at least some of the operations, procedures and/or functions described in the foregoing in context of the data acquisition means 110, the data analysis means 130, the data processing means 140, the evaluation means 150 and the control means 160 of the diagnostics system 100 and/or one of the sub-systems 100a, 100b. Hence, the apparatus 500 may comprise at least one processor 502 and at least one memory 504 including computer program code 506 for one or more programs, the at least one memory 504 and the computer program code 506 configured to, with the at least one processor 502, cause the apparatus 500 to perform at least some of the operations, procedures and/or functions described in the foregoing in context of the data acquisition means 110, the data analysis means 130, the data processing means 140, the evaluation means 150 and the control means 160 of the diagnostics system 100 and/or one of the sub-systems 100a, 100b.

The computer program code 506 may be provided e.g. as a computer program product comprising at least one computer-readable non-transitory medium having program code stored thereon, the computer program code 506, when executed by the apparatus 500, arranged to cause the apparatus 500 to perform at least some of the operations, procedures and/or functions described in the foregoing in context of the data acquisition means 110, the data analysis means 130, the data processing means 140, the evaluation means 150 and the control means 160 of the diagnostics system 100 and/or one of the sub-systems 100*a*, 100*b*. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A diagnostics system for estimating operational efficiency of a marine vessel that employs a propulsion system including a propeller mounted to a rotatable shaft for converting rotative shaft power transferred from the rotatable shaft to the propeller into thrust to propel the marine vessel across water, the diagnostics system comprising:
at least one processor and at least one memory including computer program code for one or more programs, the at least one memory and the computer program code being configured with the at least one processor to:
obtain a respective time series of values for a plurality of operating parameters of the marine vessel, including at least:
a respective time series of values for one or more propulsion parameters including at least the rotatable shaft power usage,
a respective time series of values for one or more primary operating parameters including at least speed through water of the marine vessel and average draught of the marine vessel, and
a respective time series for one or more secondary operating parameters;
construct a multi-dimensional power matrix for a first time period based on operating parameter values of said plurality of time series within a respective sub-series thereof that represents said first time period, where in the power matrix:
a value of a given operating parameter defines a cell position along a dimension of the power matrix that represents the given operating parameter, a combination of the operating parameter values at a given time instant uniquely defining a cell position within the power matrix, and
each cell of the power matrix stores a number of occurrences of the cellposition-defining combination of operating parameter values within said time period;
compute, for each propulsion parameter, a respective one or more fouling values based on one or more representative propulsion parameter values derivable based on one or more respective subgroups of cells of the power matrix in comparison to respective one or more propulsion parameter values derivable based on a corresponding subgroup of cells of a base matrix, wherein the base matrix has a structure similar to that of the power matrix, where each cell of the base matrix stores the number of occurrences of the cell-position-defining combination of operating parameter values so that the cells of the base matrix jointly represent a reference fouling level of the marine vessel; and
create one or more indications concerning operating status of the marine vessel at least in dependence of said fouling values.

2. The diagnostics system according to claim 1, wherein said propulsion parameters comprise one or more of the following:
thrust generated by a propeller, torque in a shaft, rotational speed of a shaft.

3. The diagnostics system according to claim 1, wherein said one or more secondary operating parameters comprise one or more of the following:
trim of the marine vessel, propeller pitch, rudder angle of the marine vessel, fin stabilizer angle in the marine vessel, wind speed in relation to the marine vessel, wind direction in relation to the marine vessel, kinematic viscosity of water, water depth.

4. The diagnostics system according to claim 1, wherein the processor is configured to construct the power matrix based on a respective combination of operating parameter values of said plurality of time series at a plurality of time instants within the first time period.

5. The diagnostics system according to claim 1, configured to construct the power matrix for a given time instant of the first time period by:
obtaining, for the given time instant, a respective value for each of the plurality of operating parameters;
identifying a cell position of the power matrix defined by a combination of the respective obtained values of the plurality of operating parameters; and
incrementing the value in the identified cell position of the power matrix by one.

6. The diagnostics system according to claim 5, configured to construct the power matrix for a given time instant of the first time period by:
rounding, prior to identifying the cell position, one or more of the obtained operating parameter values to a closest available value in accordance with a predefined range of values for the respective operating parameter.

7. The diagnostics system according to claim 1, configured to:
define one or more subgroups of cells, wherein cell positions of each subgroup are defined by a respective predefined combination of constant values of the primary and secondary operating parameters;
define one or more groups of cells that each include one or more subgroups of cells, wherein cell positions of each group are defined by a respective predefined combination of constant values of the primary operating parameters;
compute, for each propulsion parameter, a respective representative propulsion parameter value for said one or more subgroups of cells based on respective propulsion parameter values associated with the cell positions of the respective subgroup in the power matrix in comparison to respective propulsion parameter values associated with the cell positions of the corresponding subgroup in the base matrix; and
compute, for each propulsion parameter, a respective fouling value for said one or more groups of cells based on the one or more representative propulsion parameter values computed for a respective propulsion parameter.

8. The diagnostics system according to claim 7, wherein, for each propulsion parameter, the respective representative propulsion parameter value for a given subgroup of cells is computed as a difference between an average of respective propulsion parameter values associated with the cell positions of the respective subgroup in the power matrix and an average of respective propulsion parameter values that are associated with the cell positions of the corresponding subgroup in the base matrix.

9. The diagnostics system according to claim 7, wherein the fouling value for a given propulsion parameter for a given group of cells is computed as a weighted average of respective representative propulsion parameter values computed for the subgroups of cells that constitute the given group of cells.

10. The diagnostics system according to claim 9, wherein computing the weighted average comprises:
computing, for each subgroup of cells within a group of cells, a first factor that is defined as the smaller of a sum of cell values of the cells of the respective subgroup in the power matrix and a sum of cell values of the cells of the respective subgroup in the base matrix;
computing a second factor as the sum of first factors computed for the subgroups that constitute the respective group; and
weighting each representative propulsion parameter value by a respective weighting factor that is defined as the ratio of the respective first factor and the second factor.

11. The diagnostics system according to claim 7, configured to update values of each group of cells of the base matrix based on the fouling values computed for the respective group of cells of the power matrix.

12. The diagnostics system according to claim 11, wherein said updating comprises:
computing a modified power matrix by shifting, for each propulsion parameter in each group of cells, the cell values by an amount defined by the respective fouling value along the dimension of the power matrix that represents the respective propulsion parameter; and
computing an updated base matrix as a sum of the modified power matrix and the base matrix, wherein each cell of the updated base matrix is computed as a sum of cell values of corresponding cells of the modified power matrix and the base matrix.

13. The diagnostics system according to claim 1, configured to derive, based on a fouling value for at least one propulsion parameter for at least one group of cells and based on a plurality of corresponding fouling values computed for respective time periods that precede the first time period, a respective function that represents the fouling value as a function of time.

14. The diagnostic system according to claim 13, configured to provide at least one of said mapping functions for presentation in an electronic display.

15. A computer-implemented method for estimating operational efficiency of a marine vessel that employs a propulsion system including a propeller mounted to a rotatable shaft for converting rotative shaft power transferred from the rotatable shaft to the propeller into thrust to propel the marine vessel across water, the method comprising
obtaining a respective time series of values for a plurality of operating parameters of the marine vessel, including at least:
a respective time series of values for one or more propulsion parameters including at least the rotatable shaft power usage,
a respective time series of values for one or more primary operating parameters including at least speed through water of the marine vessel and average draught of the marine vessel, and
a respective time series for one or more secondary operating parameters;
constructing a multi-dimensional power matrix for a first time period based on operating parameter values of said plurality of time series within a respective sub-series thereof that represents said first time period, where in the power matrix:
a value of a given operating parameter defines a cell position along a dimension of the power matrix that represents the given operating parameter, a combination of the operating parameter values at a given time instant hence uniquely defining a cell position within the power matrix, and
each cell of the power matrix stores the number of occurrences of the cell-position-defining combination of operating parameter values within said time period;
computing, for each propulsion parameter, respective one or more fouling values based on one or more representative propulsion parameter values derivable based on one or more respective subgroups of cells of the power matrix in comparison to respective one or more propulsion parameter values derivable based on the corresponding subgroup of cells of a base matrix, wherein the base matrix has a structure similar to that of the power matrix, where each cell of the base matrix stores a number of occurrences of the cell-position-defining combination of operating parameter values so that the cells of the base matrix jointly represent a reference fouling level of the marine vessel; and
creating one or more indications concerning operating status of the marine vessel at least in dependence of said fouling values.

16. The method according to claim 15, wherein computing the one or more fouling values comprises:
defining one or more subgroups of cells, wherein cell positions of each subgroup are defined by a respective predefined combination of constant values of the primary and secondary operating parameters;
defining one or more groups of cells that each include one or more subgroups of cells, wherein cell positions of each group are defined by a respective predefined combination of constant values of the primary operating parameters;
computing, for each propulsion parameter, a respective representative propulsion parameter value for said one or more subgroups of cells based on respective propulsion parameter values associated with the cell positions of the respective subgroup in the power matrix in comparison to respective propulsion parameter values associated with the cell positions of the corresponding subgroup in the base matrix; and
computing, for each propulsion parameter, a respective fouling value for said one or more groups of cells based on the one or more representative propulsion parameter values computed for the respective propulsion parameter.

17. The method according to claim 16, wherein, for each propulsion parameter, the respective representative propulsion parameter value for a given subgroup of cells is computed as the difference between an average of respective propulsion parameter values associated with the cell positions of the respective subgroup in the power matrix and an average of respective propulsion parameter values that associated with the cell positions of the corresponding subgroup in the base matrix.

18. The method according to claim 15, comprising:
   updating values of each group of cells of the base matrix based on the fouling values computed for the respective group of cells of the power matrix.

19. The method according to claim 18, wherein said updating comprises:
   computing a modified power matrix by shifting, for each propulsion parameter in each group of cells, the cell values by the amount defined by the respective fouling value along the dimension of the power matrix that represents the respective propulsion parameter; and
   computing an updated base matrix as a sum of the modified power matrix and the base matrix, wherein each cell of the updated base matrix is computed as a sum of cell values of corresponding cells of the modified power matrix and the base matrix.

20. A computer program product comprising:
   at least one computer readable non-transitory medium having program code stored thereon, the program which when executed by one or more processors cause the one or more processors at least to perform the method according to claim 15.

* * * * *